United States Patent
Stone et al.

(10) Patent No.: US 6,311,260 B1
(45) Date of Patent: Oct. 30, 2001

(54) METHOD FOR PERFETCHING STRUCTURED DATA

(75) Inventors: Harold S. Stone, Princeton, NJ (US); Majd F. Sakr, Pittsburgh, PA (US); Mark B. Reinhold, Menlo Park, CA (US)

(73) Assignee: NEC Research Institute, Inc., Princeton, NJ (US)

(*) Notice: Subject to any disclaimer, the term of this patent is extended or adjusted under 35 U.S.C. 154(b) by 0 days.

(21) Appl. No.: 09/257,412

(22) Filed: Feb. 25, 1999

(51) Int. Cl.$^7$ ................. G06F 9/32; G06F 12/02
(52) U.S. Cl. ............ 711/213; 711/137; 711/204; 711/216; 712/205; 712/207
(58) Field of Search ................. 711/118, 137, 711/154, 204, 213, 216; 712/205, 206, 207

(56) References Cited

U.S. PATENT DOCUMENTS

| | | | |
|---|---|---|---|
| 4,525,780 | * 6/1985 | Bratt et al. | 711/163 |
| 4,583,165 | * 4/1986 | Rosenfeld | 711/213 |
| 5,093,777 | 3/1992 | Ryan | 711/3 |
| 5,206,822 | * 4/1993 | Taylor | 708/607 |
| 5,305,389 | 4/1994 | Palmer | 382/305 |
| 5,357,618 | 10/1994 | Mirza et al. | 711/3 |
| 5,361,391 | 11/1994 | Westberg | 711/137 |
| 5,367,656 | 11/1994 | Ryan | 711/213 |
| 5,377,336 | 12/1994 | Eickemeyer et al. | 712/207 |
| 5,619,676 | 4/1997 | Fukuda et al. | 711/137 |
| 5,721,865 | * 2/1998 | Shintani et al. | 712/207 |
| 5,790,823 | 8/1998 | Puzak et al. | 712/207 |
| 6,076,151 | * 6/2000 | Meier | 711/171 |
| 6,253,306 | * 6/2001 | Ben-Meir et al. | 712/207 |

OTHER PUBLICATIONS

Chen, et al., A Performance Study of Software and Hardware Data–Prefetching Schemes, Proceeding of the 21st International Symposium on Computer Architecture, pp. 223–232, 1994.

Dahlgren, et al., "Effectiveness of Hardware–Based Stride and Sequential Prefetching In Shared–Memory Multiprocessors", First IEEE Symposium on High–Performance Computer Architecture, pp. 68–77, Jan. 1995.

Fu, et al., "Data Prefetching In Multiprocessor Cache Memories", Proceedings of the 18th International Symposium on Computer Architecture, pp. 54–63, 1991.

Mowry, et al., "Design And Evaluation Of A Compiler Algorithm For Prefetching", Proceedings of the 5th International Conference On Architectural Support for Programming Languages and Operating Systems, pp. 62–73, 1992.

* cited by examiner

Primary Examiner—Tuan V. Thai
(74) Attorney, Agent, or Firm—Scully, Scott, Murphy & Presser

(57) ABSTRACT

A method for prefetching structured data, and more particularly a mechanism for observing address references made by a processor, and learning from those references the patterns of accesses made to structured data. Structured data means aggregates of related data such as arrays, records, and data containing links and pointers. When subsequent accesses are made to data structured in the same way, the mechanism generates in advance the sequence of addresses that will be needed for the new accesses. This sequence is utilized by the memory to obtain the data somewhat earlier than the instructions would normally request it, and thereby eliminate idle time due to memory latency while awaiting the arrival of the data.

16 Claims, 2 Drawing Sheets

METHOD FOR PERFETCHING STRUCTURED DATA

BACKGROUND OF THE INVENTION

1. Field of the Invention

The present invention relates generally to a method for prefetching structured data, and more particularly pertains to a mechanism for observing address references made by a processor, and learning from those references the patterns of accesses made to structured data. Structured data means aggregates of related data such as arrays, records, and data containing links and pointers. When subsequent accesses are made to data structured in the same way, the mechanism generates in advance the sequence of addresses that will be needed for the new accesses. This sequence is utilized by the memory to obtain the data somewhat earlier than the instructions would normally request it, and thereby eliminate idle time due to memory latency while awaiting the arrival of the data.

In a modern computer system, a memory system consists of a slow main memory and one or more levels of a fast cache memory. Items that are frequently used are brought from main memory to the cache memory, where they are held while they are actively used. When they are no longer active, they are removed from the cache memory to make room for newly active items. Although this practice enables memory accesses to be made to the cache in most cases, the first reference to data is to data resident in the slow memory, and such a reference is usually accompanied by a significant time penalty. When items are reused many times while resident in cache memory, the penalty of the first access is amortized over the many subsequent references to the cache memory. But some programs, particularly transaction programs, tend to make relatively few references to records and buffers, and receive relatively less benefit from cache memory than do highly iterative programs that repeatedly reference the same data structures.

It is the goal of the present invention to reduce the latency associated with the first memory reference to elements of a data structure by recognizing when the data structure is first being referenced, and then prefetching the elements of that data structure that will be used prior to when the processor needs to have them.

2. Discussion of the Prior Art

Dahlgren and Strenstrom [Dahlgren, F., and P. Stenstrom, "Effectiveness of hardware-based stride and sequential prefetching in shared-memory multiprocessors, "First IEEE Symposium on High-Performance Computer Architecture, pp. 68–77, January 1995] describe a hardware-based prefetching algorithm (a variation of Baer and Chen [Baer, J.-L., and T.-F. Chen, "An effective on-chip preloading scheme to reduce data access penalty", in Proceedings of Supercomputing '91, pp. 176–186, November, 1991] that calculates potential strides on every cache-miss and associates the instruction address to the stride. In contrast thereto, in the present invention the prefetching mechanism is a hybrid, software/hardware based, which is not cache-miss initiated and detects/prefetches both strided and linked data.

A hybrid prefetching scheme is proposed by Bianchini and LeBlanc [Bianchini, R., and T. J. LeBlanc, "A preliminary evaluation of cache-miss-initiated prefetching techniques in scalable multiprocessors," Technical Report 515, Computer Science Department, University of Rochester, May 1994]. It is a cache-miss initiated technique that prefetches strided data. The program compiler computes the stride of access for an instruction and the number of blocks to prefetch on each cache miss. On a read miss, the cache controller, using a hardware table for storing stride-related information, fetches the block that caused the miss and prefetches additional blocks with a certain stride. In contrast thereto, in the present invention the compiler does not compute the stride of access for an instruction. Rather, it just adds hints to the instructions that access strided or linked data. The stride is determined during program execution so that the technique is somewhat more general. Also, the technique potentially prefetches on every execution of the instruction instead of on cache read-misses only, so that it can be triggered without having to suffer a cache miss to force the triggering.

Fu and Patel [Fu, J. W. C., and J. H. Patel, "Data prefetching in multiprocessor cache memories," Proceedings of the 18th International Symposium on Computer Architecture, pp. 54–63, 1991] propose a hardware-based data prefetching mechanism for multiprocessor vector cache memories. It is a hardware-based mechanism that assumes all the information associated with the memory accesses—namely the base address, the stride, the element size and vector length—is available to the cache controller. On a cache miss, if a reference is made to a scalar or data of short stride then sequential blocks are prefetched. If the reference is to a vector (long stride) then it prefetches a number of cache blocks offset by the stride. In contrast thereto, in the present invention the mechanism employs software and hardware to perform the prefetching. The use of software helps the hardware to focus on more places where prefetching is useful, and thus is useful in a broader context than for vector memories. Also, the mechanism prefetches both strided and linked data.

Mowry, Lam, and Gupta [Mowry, T. C., M. Lam, and A. Gupta, "Design and evaluation of a compiler algorithm for prefetching," Proceedings of the 5th International Conference on Architectural Support for Programming Languages and Operating Systems, pp. 62–73, 1992] propose a compiler algorithm that inserts prefetch instructions into code that operates on dense matrices. The algorithm identifies references that are likely to be cache misses and issues a special prefetch instruction for them. This algorithm is software-based while the prefetching of the present invention is both software and hardware based. In the mechanism of the present invention, the compiler does not predict where a cache miss will occur in the code, it just inserts hints to strided and linked data. The hardware uses these hints to prefetch the data, if not already in cache, thereby avoiding misses that otherwise might be incurred.

Chen and Baer [Chen, T.-F. and J. L. Baer, "A performance study of software and hardware data-prefetching schemes," "Proceedings of the 21st International Symposium on Computer Architecture, pp. 223–232, 1994] propose a hybrid prefetching algorithm that combines the hardware-based prefetching scheme of Baer and Chen [supra] and the software-based prefetching algorithm of Mowry, Lam, and Gupta [supra]. These two prefetching mechanisms run in parallel to prefetch data at different cache levels. Also, the compiler, using a special control instruction, can enable or disable hardware prefetching. The hardware prefetching mechanism is cache-miss-initiated, and the software inserts special prefetch instructions in the code where it predicts a cache miss will occur. The two mechanisms function separately and do not share information. In contrast thereto, in the prefetching scheme of the present invention, the software provides hints for the hardware to perform the prefetching and the prefetch is not cache-miss-initiated.

The patent literature has a number of inventions that relate to the present invention. Mirza, et al., [Mirza, J. H., et al., "Cache prefetch and bypass using stride registers," U.S. Pat. No. 5,357,618, Oct. 18, 1994] describe a prefetch mechanism for strided data. Their mechanism uses software controlled stride registers to control strided prefetch, and does not perform unstrided prefetch.

Eickemeyer, et al., [Eickemyer, R. J., et al., "Improved method to prefetch Load-instruction," U.S. Pat. No. 5,357,336, Dec. 27, 1994] describe a means for peeking ahead in an instruction stream to find Load instructions. When a Load instruction is likely to be executed, the mechanism predicts the address of the Load and does a prefetch to that address. It is not triggered by compiler hints, and consequently, it may perform more nonuseful prefetches than the scheme of the present invention, with a corresponding loss of performance.

Ryan [Ryan, C. P., "Method and apparatus for predicting address of a subsequent cache request upon analyzing address patterns stored in a separate miss stack," U.S. Pat. No. 5,093,777, Mar. 3, 1992] describes a scheme that is triggered by recent cache misses to analyze reference patterns that will produce prefetches for future references. Since it is triggered by cache misses, it must incur a penalty in order to invoke prefetching. Ryan [Ryan, C. P., "Controlling cache predictive prefetching based on cache hit-ratio trend," U.S. Pat. No. 5,367,656, Nov. 22, 1994] is a refinement of the approach described in Ryan [1992]. The revised prefetch mechanism also relies on cache misses to trigger prefetches.

Westberg [Westberg, T. E., "Intelligent cache memory and prefetch method based on CPU data-fetching characteristics," U.S. Pat. No. 5,361,391, Nov. 1, 1994] describes a hardware mechanism that attempts to prefetch based on historical reference patterns. Since it is not controlled by software, it has no capability to focus on data references that are most likely to benefit from prefetching.

Palmer [Palmer, M. L.,"Predictive cache system," U.S. Pat. No. 5,305,389, Apr. 19, 1994] describes a scheme that is like the present invention in the use of training sequences to identify sequences amenable to prefetch. However, the trainer is not invoked by software, and does not specifically deal with strided accesses and accesses to data structures. Palmer describes a hardware "prophet" mechanism that predicts addresses for prefetches. In the present invention, the training and prediction are triggered by compiler generated hints, and thus lead to more effective prefetching than can be done without the information provided by a compiler.

Puzak and Stone (U.S. Pat. No. 5,790,823, issued Aug. 4, 1998) describe the use of a mechanism they call an Operand Pefetch Table. Each entry in this table is the address of an operand that was fetched by an instruction that caused a miss. When the instruction misses again, the computer system can find the operand the instruction fetched when the instruction last caused a miss. The computer prefetches that operand if the instruction misses again. This mechanism requires an instruction to miss repeatedly, and prefetches on each of those misses, which is different from the present invention which prefetches without having to experience a cache miss.

Naoyuki, et al. (U.S. Pat. No. 5,619,676, issued Apr. 8, 1997) describe a prefetch unit that can use one of several stored equations to generate the addresses from which data or instructions are prefetched. The flexibility of their scheme enables it to do more than fixed-stride access to data. The present invention differs from Naoyuki, et al. because they do not disclose how to create the equations from observations of fetches in the data stream. In contrast thereto, the present invention teaches how to use hints on instructions to identify base addresses and offsets, and how to use a prefetch unit to learn what offsets should be used in future prefetches.

SUMMARY OF THE INVENTION

The present invention provides a mechanism that is added to a conventional processor to enable the processor to learn sequences of addresses produced by frequently executed code fragments. The mechanism detects when a learned sequence is repeated, and then generates the remaining addresses in that sequence in advance of the time when they would normally be generated. The early generation allows these addresses to be sent to the main memory to obtain the items and bring them to the cache memory earlier than the processor would normally request them, and thereby reduce the idle time that the processor would otherwise experience.

The subject invention memorizes sequences of references made relative to a base address of a data structure. When a similar data structure with a different base address is accessed, the prefetch mechanism produces a sequence of address references relative to the new base address in such a way that the sequence is offset from the new base address in exactly the same way as the model sequence is offset from its base address. The present invention also maintains a history of base address values and recognizes when a base address register produces references at constant offsets. It uses this information to prefetch new data at the same constant offset.

The present invention utilizes the following concepts and components:

1. Instructions are encoded with a few extra bits per instruction that control the prefetch mechanism. This field is called the hint field.
2. Visible general registers are extended to contain one extra field per register that is called the hash field. The contents of hash fields are controlled by the hint fields of instructions. When the execution of an instruction modifies or uses the contents of a register, the hint field is also used or modified as described later in this document. The contents of the hint field are implementation dependent, and are not accessible to the program for examination or use within computations. The existence of hint fields cannot be detected by program execution, and the contents of the fields cannot alter the flow of execution or change the results produced by ordinary computations. (It may be necessary to violate this property in programs that diagnose a computer to determine if it is working properly.)
3. A prefetch unit is incorporated into the processor. The prefetch unit holds frames of prefetch sequences, each frame holding one base address, a list of offsets associated with the base address, and a history list of past base addresses. When a frame is active and is used for prefetching, and when the base address within the frame is set with a current value, the prefetch unit generates a prefetch address for each offset linked to that base address. The prefetch address is the sum of the base address and the offset.
4. The prefetch unit contains a subunit, the cache-line checker, that tests each candidate prefetch address to determine if the candidate is to a cache line for which a prefetch has already been issued. If so, the candidate address is not sent to main memory.
5. The prefetch unit has a Learn Mode in which a new sequence of addresses is observed, allowing the prefetch unit to create the lists of offsets associated with each base address.

6. The prefetch unit has a Prefetch Mode triggered when the prefetch unit discovers that a learned sequence is being reexecuted. In the prefetch mode, the prefetch unit generates a sequence of prefetch addresses, removes references to duplicate cache lines, and sends the remaining addresses to the memory system for prefetching.

BRIEF DESCRIPTION OF THE DRAWINGS

The foregoing objects of the advantages of the present invention for a method for prefetching structured data may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
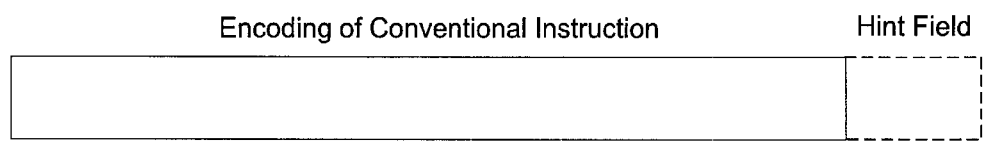
FIG. 1 a conventional instruction to which a hint field has been added, wherein the hint field controls when the prefetch unit becomes active, either in a learning mode or in a prefetching mode.

FIG. 1 shows a conventional instruction to which a hint field has been added, such as the exemplary hint fields of the two examples, infra. The hint field controls when the prefetch unit becomes active, either in a learning mode or in a prefetching mode.

Figure 2:
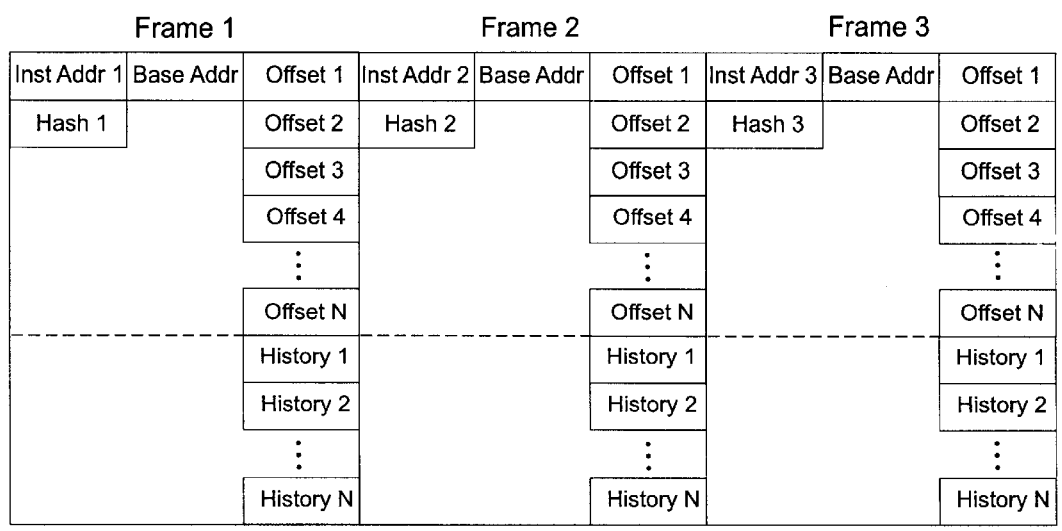
FIG. 2 shows the structure of a prefetch unit which is partitioned into a plurality of frames, wherein each frame contains an instruction address, a hash field, a single base address, a list of offsets, and a history list which is a list of past values of the base-address register.

FIG. 2 shows the structure of a prefetch unit. The unit is partitioned into one or more frames. Each frame contains an instruction address, a hash field, a single base address, a list of offsets, and a history list. The history list is a list of past values of the base-address register.

Figure 3:
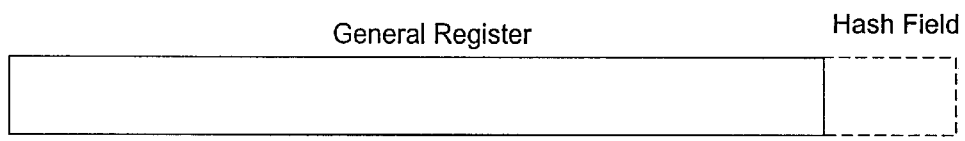
FIG. 3 illustrates a conventional visible general register having a hash field appended thereto which is implementation dependent, and wherein the contents of each hash field is controlled by the hint fields of instructions.

FIG. 3 shows the structure of a general register. The conventional general register has a hash field appended to it, as explained in detail, infra. The size of the hash field is implementation dependent, and the contents of hash fields cannot be transferred to visible fields of machine registers by ordinary (nondiagnostic) instructions or alter the flow of execution of an ordinary (nondiagnostic) program.

Figure 4:
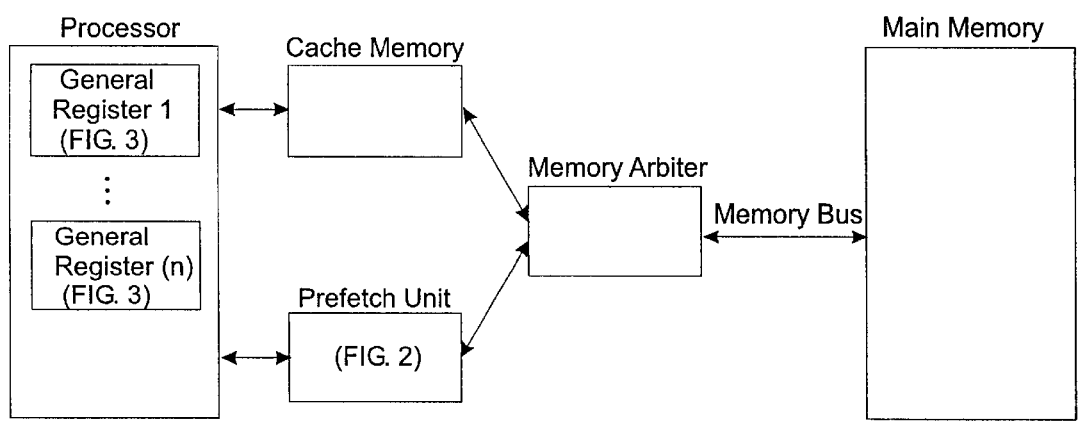
FIG. 4 illustrates how the prefetch unit operates in conjunction with a cache memory which produces references to the main memory to obtain items that are requested by the processor when the items are not in cache, wherein the prefetch unit also produces references to the main memory and shares the memory bus path between the main memory and the cache/prefetch memory.

FIG. 4 shows how the prefetch unit operates in conjunction with a cache memory. The cache memory in this figure produces references to main memory to obtain items that are requested by the processor when the items are not in cache. The prefetch unit also produces references to main memory, and it shares the path between main memory and the cache/prefetch memory. The prefetch unit has a lower priority than the cache so that when conflicts occur, the cache is awarded access in preference to the prefetch unit. The prefetch unit attempts to place its requests for prefetches on the memory bus in advance of when the data are required by the program.

Typical Instruction Sequences:

A typical sequence of references to a data structure consists of:

1. An instruction that places the address of the base (base address) of the data structure into a general register.
2. A sequence of instructions that generate references to offsets of that base address.

Code sequences that access transaction buffers normally intertwine references to several data structures so that the code sequences involve several base addresses, and they are intertwined in unpredictable ways. However, when code is repeated for different base addresses, the sequence of offsets are generally identical for each repetition of the code even though the base addresses are different. Hence, the sequence of addresses is totally predictable provided that the offsets produced by a prior execution have been captured by a prefetch mechanism.

Control of the Prefetch Unit by the Hint Field:

The hint field contains one of three possible hints to the prefetch unit:

1. Set base: The current instruction sets the contents of a base address register.
2. Use base: The current instruction generates an address of an item relative to a base address register.
3. No Op (Nop): The current instruction does not participate in addressing or memory references.

Processor Action:

The processor executes each instruction in the normal manner. In addition, the processor does the following actions in response to the contents of hint fields.

1. Set Base: The processor initializes the hash field of the register by filling it with a randomly generated code (used as an address). The processor sends the hash code, the new contents of the base address register, the address of the instruction that issued the Set Base hint, and a Set Base hint to the prefetch unit.
2. Use Base: The processor calculates the effective address of the operand and sends this together with the hash code of the base address register used for the effective address calculation together with a Use Base hint to the prefetch unit.
3. No Op: The processor takes no special action for prefetching.

Prefetch Unit Actions:

The Prefetch Unit can be in one of two states:

1. Learn Mode, or
2. Prefetch Mode.

For each frame, the mode of operation is determined by events that take place when the Prefetch Unit receives a Set Base command. Once the mode is determined, the Prefetch Unit remains in that mode for that frame for any number of Use Base hints that refer to the frame. On the receipt of the next Set Base command the Prefetch Unit determines whether to enter Learn Mode or Prefetch Mode for the newly referenced frame.

Prefetch Unit Response to Set Base Commands:

When a Prefetch unit receives an instruction address together with the Set Base command, the Prefetch unit searches its frames for an address identical to the instruction address. If one is found, the Prefetch unit places that frame in Prefetch Mode. If not, the Prefetch unit empties a frame and makes room for the offsets that will be produced by the instructions that follow for this frame. The new frame is placed in Learn Mode. In both cases, the hash code transmitted with the hint is saved in the frame, and will be used to match subsequent Use Base hints. The response from this point depends on the state of the frame as follows.

1. Learn Mode: The prefetch unit places the base address at the start of a list of the history of base addresses for this frame. The history list is initialized to the null (empty) list. It initializes the contents of the register to the address that has been transmitted to the prefetch unit with this hint. The prefetch unit initializes a list of offsets attached to the newly allocated register to the null (empty) list.

2. Prefetch Mode: The prefetch unit pushes the present contents of the base address register onto a history list that is held in First-In, First-Out order (FIFO), and places the new value from the Set Base command into the base address register at the head of the history list.

The prefetch unit then initiates prefetches according to the contents of the history list and of the offset list. For each offset in the offset list, the prefetch unit adds the offset in the list to the new value of the base address register, and issues a Prefetch for the memory block at that address. The prefetch unit also analyzes the history list. Using at least the present value of the base address register and the two most recent prior values of the base address register, the prefetch unit calculates the offsets of these successive addresses by subtracting from a register value the immediately preceding value in the history list. If the latest two history offsets are identical, the prefetch unit issues a prefetch for the memory block at the address computed by adding the history offset to the present base address. The prefetch unit can look deeper into the history list and can use other schemes to recognize patterns more complicated than a constant offset if such schemes are useful.

Prefetch Unit Response to Use Base Commands:

In response to a Use Base hint, the prefetch unit searches its frames for a base register whose hash code matches the hash code that accompanies the Use Base hint. The response from this point depends on the state of the frame. If there is no match, the hint is ignored.

1. Learn Mode: The prefetch unit calculates an offset by subtracting the contents of the matching base register from the address transmitted with the Use Base hint. This offset is appended to the list of offsets associated with the base register.

2. Prefetch Mode: The prefetch unit takes no further action if the frame is in a Prefetch Mode.

FIRST EXAMPLE

The first example covers references to array elements. In a simple program loop that runs through the elements of an array, the source code may look like the following:

For I:=1 to 10 do
begin
    X(I)=I
end.

The machine language code would look like the following:

| Instruction number | Machine instruction | Prefetch Hint |
|---|---|---|
| 1 | R1:=1 | Nop |
| 2 | R3:=address of X(10) | Nop |
| 3 | R2:=address of X(1) | (Set Base, address of X, Hashcode of R2, instruction address) |
| 4 | Loop:Memory(R2):=R1 | (Use base, contents of R2, Hashcode of R2) |
| 5 | R2:=R2 + length of X(I) | (Set Base, address of X, Hashcode of R2, instruction address) |
| 6 | R1:=R1 + 1 | Nop |
| 7 | If R2<+R3 then goto loop | Nop |

With the prefetch unit uninitialized, Instruction 3 creates a prefetch frame with instruction address 3, and similarly, Instruction 5 creates a prefetch frame with instruction address 5. The next 9 iterations of the loop pass through Instruction 5 repeatedly. On the second and subsequent passes, the Set Base hint causes the history list associated with Instruction 5 to be extended. On the third pass, the Set Base hint discovers that the offset between the first two instances of the Set Base hint is the same as the offset between the second and third instances of the Set Base hint. The prefetch unit uses this offset to generate an address for the next element of array X, and issues a prefetch if the item is not present in cache memory and the memory block containing that element has not already been prefetched.

In this example the prefetch unit makes no use of the offsets saved in conjunction with the Use Base hint. The hints produced by Set Base are sufficient to generate prefetch requests for accesses made with a constant offset.

SECOND EXAMPLE

The second example illustrates the actions taken for structured records. Assume that the source language program creates a log record, writes it to temporary storage, and then commits the change with other updates as a single atomic (indivisible) update as follows:

Begin Update:
Allocate memory for Buffer1;
Buffer1.date:=today's date;
Buffer1.amt:=transaction amount;
Buffer1.accountnum:=account number;
Write Buffer to Log;
End Update;
. . .
Commit(Buffer1, Buffer2, . . . BufferN);

In this case, the machine language code would look like the following:

| Instruction number | Machine instruction | Prefetch Hint |
|---|---|---|
| 1 | R1:=address of Buffer1 | (set Base, address of X, Hashcode of R1, instruction address) |
| 2 | R3:=date Memory | Nop |

-continued

| Instruction number | Machine instruction | Prefetch Hint |
|---|---|---|
| 3 | Memory (R1:+datefield) :=R3 | (Use Base, Hashcode of R1, contents of R1) |
| 4 | R3:=trans_amt | Nop |
| 5 | Memory (R1+amtfield) :=R3 | (Use Base, Hashcode of R1, contents of R1) |
| 6 | R3:=accountnum | Nop |
| 7 | Memory (R1+acctfield) :=R3 | (Use Base, Hashcode of R1, contents of R1) |

For this example, assume that the Prefetch Unit is initialized. The first execution of this sequence will create a frame with a base address identified as Register R1, and three offsets corresponding to the offsets datefield, amtfield, and acctfield for the three items in the buffer. These offsets can be arbitrary constants. The next execution of the sequence will result in the Set Base hint causing the frame for Instruction 1 to be placed into Prefetch Mode since the frame for that instruction exists at the time the Set Base hint is sent to the prefetch unit. At this point, the prefetch unit will generate three prefetches by adding the offsets in the list of offsets to the base address transmitted with the Set Base hint.

Other Functional Behavior:

In the Prefetch mode, the prefetch unit generates addresses from the lists of offsets and current value of a base address. These addresses need not be to distinct cache lines. The prefetch unit can maintain a cache-like memory of recently generated cache lines, and consult the memory as each new candidate address is issued. The memory should indicate whether or not a prefetch for the same cache line has already been issued. If so, the prefetch unit would not generate a new reference to the same line.

In case both the prefetch unit and the cache memory generate memory requests to the system memory, cache memory should be granted priority over the prefetch unit when the system cannot respond to both requests concurrently.

In some program codes, new base addresses may be computed from other base addresses. To optimize prefetching in the context of the invention, it is best if the new base addresses refer to the same cache frame as the original base address. This can be arranged by copying the hash field together with the value of the register when each new base address is set. Then the hash field that is sent to the prefetch unit when a new base address is used will point to the frame that corresponds to the original address.

While several embodiments and variations of the present invention for a method for prefetching structured data are described in detail herein, it should be apparent that the disclosure and teachings of the present invention will suggest many alternative designs to those skilled in the art.

What is claimed is:

1. A method of operating a processing system comprising a processor for processing program instructions and data, including a memory system comprising a relatively slow main memory and a relatively fast cache memory, wherein items which are frequently and actively used are transferred from the main memory to the cache memory for storage while they are being actively used, and items which are no longer actively used are removed from the cache memory to make room for newly actively used items comprising, equipping the processor with a prefetch unit which sends a sequence of prefetch addresses to the main memory to obtain and bring items to the cache memory earlier than the processor would request them and thereby reduce the idle time that the processor would otherwise experience, encoding each instruction with a hint field which controls the prefetch unit, wherein the information in the hint field enables the prefetch unit to detect both fixed and variable offsets to a base address in strided and linked structured data, and utilizes the detected fixed and variable offsets relative to a new base address to generate the sequence of prefetch addresses.

2. A method of operating a processing system as claimed in claim 1, wherein:
   a. the prefetch unit holds frames of prefetch sequences, each frame holding one base address, a list of offsets associated with the base address, and a history list of past base addresses;
   b. providing a plurality of general registers in the processor with a hash field, wherein the contents of each hash field is controlled by the hint fields of instructions;
   c. wherein the hint field contains three possible hint commands to the prefetch unit, and the processor executes each program instruction in a normal manner, and additionally takes the following actions in response to the contents of a hint field, which contains one of three possible hint commands to the prefetch unit,
      i. set base command, in which the processor sets the contents of a base register, or
      ii. use base command, in which the processor generates an address of an item relative to a base register, or
      iii. no op command, in which the processor takes no special action for prefetching;
   d. the prefetch unit can be in one of either a learn mode of operation, or a prefetch mode of operation, and for each frame the mode of operation is determined when the prefetch unit receives a set base command, and once the mode is determined the prefetch unit remains in that mode for that frame for any number of use base hints that refer to that frame, and on receipt of the next set base command the prefetch unit determines whether to enter the learn mode or the prefetch mode for a next frame;
   e. in the learn mode, the prefetch unit detects a new sequence of addresses, and generates lists of offsets associated with each base address, and maintains a history of base address values, and recognizes when a base address register produces references at constant offsets.
   f. in the prefetch mode, the prefetch unit detects when a sequence of addresses previously detected in the learn mode is being reexecuted with a different base address, and generates a sequence of prefetch addresses relative to the new base address, and utilizes the sequence of prefetch addresses for prefetching of the items.

3. A method of operating a processing system as claimed in claim 1, wherein in the prefetch mode, the prefetch unit examines the generated sequence of prefetch addresses, and removes references to duplicate cache lines.

4. A method of operating a processing system as claimed in claim 1, wherein in the prefetch mode, the prefetch unit generates a prefetch address for each offset linked to that base address which is the sum of the base address and the offset.

5. A method of operating a processing system as claimed in claim 1, wherein the cache memory produces references to main memory to obtain items therefrom that are requested by the processor when the items are not in cache memory, the prefetch unit also produces references to the main memory, and shares a memory bus path between the main memory and the cache/prefetch memory, and the prefetch unit has a lower priority that the cache memory so that the cache memory is awarded access to the main memory in preference to the prefetch unit.

6. A method of operating a processing system as claimed in claim 1, wherein in the prefetch mode, the prefetch unit generates the sequence of addresses with reference to distinct cache memory lines.

7. A method of operating a processing system as claimed in claim 1, wherein in the prefetch mode, the prefetch unit generates the sequence of addresses with reference to a cache-like memory of recently generated cache lines maintained by the prefetch unit.

8. A method of operating a processing system as claimed in claim 1, wherein new base addresses are computed from existing base addresses, and each new base address refers to the same cache frame as the original existing base address, by copying the hash field and the value of the original base register for each new base address, and then the hash field sent to the prefetch unit when the new base address is used will point to the frame that corresponds to the original base address.

9. A method of operating a processing system as claimed in claim 1, wherein the processor responds to a set base command by setting the contents of a base register by initializing the hash field of the base register by filling it with a hash address code, and the processor sends to the prefetch unit the hash code, the new contents of the base register after execution of the instruction, the set base command, and the instruction address of the instruction that issued the set base command.

10. A method of operating a processing system as claimed in claim 9, wherein the hash address code is a randomly generated code.

11. A method of operating a processing system as claimed in claim 9, wherein the processor responds to a use base command by calculating an effective address of an operand relative to the base register, and sends to the prefetch unit the calculated effective address, the hash code of the base register used for the effective address calculation, and the use base command.

12. A method of operating a processing system as claimed in claim 11, wherein the prefetch unit responds to a set base command as follows, when the prefetch unit receives a set base command and the instruction address, the prefetch unit searches its frames for an address identical to the instruction address, and if one is found, the prefetch unit places that frame in the prefetch mode, and if not, the prefetch unit places a new frame in the learn mode, emptying the new frame to make room for offsets that will be produced by instructions that follow for this frame, and in both learn and prefetch modes, the hash code transmitted with the set base command is saved in the frame, and is used to match subsequent use base hints.

13. A method of operating a processing system as claimed in claim 12, wherein in the learn mode, the prefetch unit places the base address of the base register at the start of a history list of base addresses for this frame, the history list is initialized to a null empty list, the new contents of the base register is initialized to the instruction address transmitted to the prefetch unit with this hint, and the prefetch unit initializes a list of offsets attached to the newly allocated register to a null empty list.

14. A method of operating a processing system as claimed in claim 13, wherein in the prefetch mode, the prefetch unit pushes the present contents of the base address register onto a history list that is held in First-In, First-Out (FIFO) order, and places the new value from the set base command into the base address register at the head of the history list, the prefetch unit then initiates prefetches according to the contents of the history list and of the offset list, and for each offset in the offset list, the prefetch unit adds the offset in the list to the new value of the base address register, and issues a prefetch for the memory block at that address, the prefetch unit also analyzes the history list, by using at least the present value of the base address register and the two most recent prior values, the prefetch unit calculates the offsets of these successive addresses by subtracting from a register value the immediately preceding value in the history list, if the latest two history offsets are identical, the prefetch unit issues a prefetch for the memory block at the address computed by adding the history offset to the present base address.

15. A method of operating a processing system as claimed in claim 14, wherein the prefetch unit responds to a use base command as follows, when the prefetch unit receives a use base command, the prefetch unit searches its frames for a base register whose hash code matches the hash code that accompanies the use base hint, and if there is no match, the hint is ignored, and if there is a match, i. in the learn mode the prefetch unit calculates an offset by subtracting the contents of the matching base register from the address transmitted with the use base hint, and the calculated offset is appended to the list of offsets associated with the matching base register, and ii. in the prefetch mode the prefetch unit takes no further action.

16. A method of operating a processing system as claimed in claim 11, wherein the prefetch unit responds to a use base command as follows, when the prefetch unit receives a use base command, the prefetch unit searches its frames for a base register whose hash code matches the hash code that accompanies the use base hint, and if there is no match, the hint is ignored, and if there is a match, i. in the learn mode the prefetch unit calculates an offset by subtracting the contents of the matching base register from the address transmitted with the use base hint, and the calculated offset is appended to the list of offsets associated with the matching base register, and ii. in the prefetch mode the prefetch unit takes no further action.

* * * * *